(12) United States Patent
Larson et al.

(10) Patent No.: US 7,791,683 B2
(45) Date of Patent: Sep. 7, 2010

(54) BACKLIGHT SYSTEMS FOR LIQUID CRYSTAL DISPLAYS

(75) Inventors: Brent D. Larson, Cave Creek, AZ (US); Dennis M. Davey, Glendale, AZ (US); Elias S. Haim, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 253 days.

(21) Appl. No.: 11/942,398

(22) Filed: Nov. 19, 2007

(65) Prior Publication Data
US 2009/0128735 A1 May 21, 2009

(51) Int. Cl.
*G02F 1/1335* (2006.01)

(52) U.S. Cl. ............... 349/62; 349/65; 349/64; 349/67; 362/244; 362/612; 362/615; 362/227

(58) Field of Classification Search ............ 349/62, 349/65, 64, 67, 69, 70; 362/244, 227, 611–615, 362/623, 617
See application file for complete search history.

(56) References Cited

U.S. PATENT DOCUMENTS

| | | | |
|---|---|---|---|
| 6,561,663 B2 | 5/2003 | Adachi et al. | |
| 6,608,614 B1 | 8/2003 | Johnson | |
| 7,527,414 B2* | 5/2009 | Hung et al. | 362/624 |
| 2002/0097578 A1 | 7/2002 | Greiner | |
| 2007/0070614 A1 | 3/2007 | Ng | |
| 2007/0086179 A1 | 4/2007 | Chen et al. | |
| 2007/0139957 A1 | 6/2007 | Haim et al. | |
| 2008/0055931 A1* | 3/2008 | Verstraete et al. | 362/612 |

OTHER PUBLICATIONS

Folkerts, W, et al., LED Backlight designs using Luxeon high flux light source solutions, Lumileds, SID Seattle, WA, 2004.

\* cited by examiner

*Primary Examiner*—Thoi V Duong
(74) *Attorney, Agent, or Firm*—Ingrassia Fisher & Lorenz, P.C.

(57) ABSTRACT

A backlight system for a liquid crystal display includes a substantially planar, refractive waveguide having a first major face and a second major face opposite the first major face. The waveguide includes a viewable region corresponding to a viewable area of the liquid crystal display. The system further includes a light source positioned proximate to the second major face and within the viewing region for producing light. An injection feature is proximate to one or more of the second major face and the first major face and within the viewing region to optically couple the light into the waveguide such that the light becomes waveguided light. A plurality of extraction features is proximate to one or more of the second major face and the first major face and within the viewing region to optically couple the waveguided light out of the waveguide.

26 Claims, 16 Drawing Sheets

BACKLIGHT SYSTEMS FOR LIQUID CRYSTAL DISPLAYS

TECHNICAL FIELD

The present invention generally relates to the field of liquid crystal displays (LCDs), and more particularly to direct backlight systems of LCDs.

BACKGROUND

Liquid crystal display (LCD) monitors are replacing traditional cathode ray tube (CRT) monitors in many applications because of their lighter weight and superior performance. In a typical LCD, a backlight system is placed behind an LCD panel to illuminate the LCD for viewing by a user. An array of light emitting diodes (LEDs) is used as the light source of the backlight system, although other sources of illumination can be provided.

Conventional backlight systems typically fall into one of the following two categories: direct backlight systems or edge backlight systems. A direct backlight system typically has a light source directly behind the LCD panel with an integrating cavity therebetween that enables mixing of the light from the light source, thereby improving the uniformity of the display. Conventional direct backlights can be problematic, however, in that the cavity can result in an undesirable added thickness. Edge backlight systems include light sources located at the edge of a waveguide (or "light pipe" or "light guide") placed behind the LCD panel. The light travels from the edge of the light guide until it is deflected towards the LCD panel. Although conventional edge backlight systems may be thinner than conventional direct backlight systems, such displays often fail to provide sufficient luminescence (or "brightness") for certain applications because the number of light sources is greatly reduced and because the light must propagate throughout the entire light guide from the edge of the display.

Accordingly, it is desirable to provide an improved backlight system for LCDs. In addition, it is desirable to provide a more compact backlight system with uniform luminescence. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a backlight system for a liquid crystal display includes a substantially planar, refractive waveguide having a first major face and a second major face opposite the first major face. The waveguide includes a viewable region corresponding to a viewable area of the liquid crystal display. The system further includes a light source positioned proximate to the second major face and within the viewing region for producing light. An injection feature is proximate to one or more of the second major face and the first major face and within the viewing region to optically couple the light into the waveguide such that the light becomes waveguided light. A plurality of extraction features is proximate to one or more of the second major face and the first major face and within the viewing region to optically couple the waveguided light out of the waveguide.

In accordance with another exemplary embodiment, a backlight system for a liquid crystal display includes a substantially planar waveguide including a first major face and a second major face opposite the first major face. The waveguide includes a viewable region corresponding to a viewable area of the liquid crystal display. A light source is positioned proximate to the second major face and within the viewing region for producing light, and an injection feature is positioned proximate to at least one of the second major face and the first major face and within the viewing region to optically couple the light into the waveguide such that the light becomes waveguided light. A plurality of extraction features is proximate to at least one of the second major face and the first major face and within the viewing region to optically couple the waveguided light out of the waveguide. The plurality of extraction features has an extraction density that varies.

In accordance with yet another exemplary embodiment, a liquid crystal display (LCD) includes an LCD panel having a plurality of pixels and a backlight system coupled to and illuminating the pixels to form an image. The backlight system includes a substantially planar dielectric waveguide including a first major face and a second major face opposite the first major face. The waveguide includes a viewable region corresponding to a viewable area of the liquid crystal display. A light source is positioned proximate to the second major face and within the viewing region for producing light. An injection feature is within the viewing region to optically couple the light into the waveguide via refraction such that the light becomes waveguided light. A plurality of extraction features with an extraction density that varies is within the viewing region to optically couple the waveguided light out of the waveguide.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Exemplary embodiments discussed below provide liquid crystal displays (LCDs) having waveguides with injection features that refract a majority of light from light sources into the waveguide such that the light is contained within the waveguide via total internal reflection (TIR) until extracted by extraction features. Other embodiments include waveguides having extraction features with varying extraction densities. The disclosed embodiments provide a compact backlight system with enhanced lateral spreading, mixing, and luminance.

Figure 1:
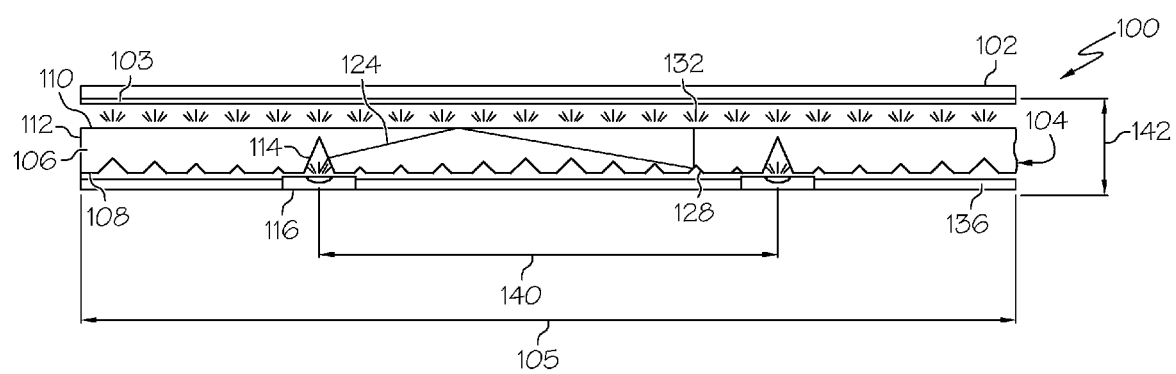
FIG. 1 is a cross-sectional view of an exemplary liquid crystal display (LCD)

FIG. 1 is a cross sectional view of an exemplary LCD 100. The LCD 100 includes a direct backlight system 104 coupled to an LCD panel 102. During operation, the backlight system 104 provides output light 132 to enable a viewer to view pixel patterns on the LCD panel 102 that form an image. The LCD 100 can be used in any display application, including avionic displays.

In a typical LCD panel 102, there is an active matrix array of many thousands of pixel structures. Although not described in greater detail for brevity, the LCD panel 102 may include, in one exemplary embodiment, any addressing structure such as a structure that includes thin film transistors processed onto a lower glass plate, cells of liquid crystal material, a common electrode adjacent to the liquid crystal material, color filters processed onto an upper glass plate, and a pair of appropriately oriented linear polarizing films. If desired, an optional transmissive diffuser 103 may be included with LCD panel 102 to further blend and homogenize output light 132. An air gap may be included between the diffuser 103 and the LCD panel 102. Any light reflected by diffuser 103 will be returned to the backlight for another chance to be scattered, deflected or reflected by the various backlight components before rejoining output light 132. Other enhancement films, such as prismatic or lenticular films, reflective or scattering polarizer films, and various types of diffusion films, may also be provided on or adjacent to the LCD panel 102 in the path of output light 132.

Generally, the backlight system 104 includes a viewable region 105 extending in front and behind the backlight system 104 that corresponds to an area of the LCD 100 viewed by a viewer. The backlight system 104 includes a unitary, refractive waveguide 106 formed from a transparent optical material such as glass, acrylic, polycarbonate, transparent polymers, or similar materials. Waveguide 106 has one or more edges 112 and two major faces 108 and 110 that are substantially parallel to each other. The backlight system 104 further includes one or more light sources 116, such as light emitting diodes (LEDs) or other light sources, distributed across the viewing region 105. The light sources 116 are optically coupled to the waveguide 106 by injection features 114 distributed across the viewing region 105 such that light (e.g., ray 124) from the light sources 116 enters the waveguide 106 via refraction.

As described in further detail below, the light is effectively confined within the waveguide 106 until reaching an extraction feature 128 that directs light out of the waveguide 106 for illumination of the LCD panel 102. In alternate embodiments, some of the light sources 116, injection features 114 and/or extraction features 128 are located out of the viewing region 105. The backlight system 104 can further include a reflective layer 136 behind the waveguide 106 and behind or adjacent the light sources 116. Reflective layer 136 serves to redirect rays which happen to be extracted in the opposite direction from output light 132, or are otherwise aimed away from LCD panel 102.

The waveguide 106 is characterized as being a unitary refractive structure in that substantially all of its distributed substructures, specifically its major faces 108, 110, injection features 114 and extraction features 128, are refractive in nature, comprising refractive materials and interfaces, for example clear plastic and air. Light rays incident on refractive interfaces follow well-characterized properties of transmission, reflection or total internal reflection (TIR), depending upon the refractive indices and angles of incidence. Certain other embodiments, described below, may not meet the strict requirements of a "unitary waveguide" in that they may include reflective mirrors, pigments, volume diffusers or other substructures not easily characterized by the laws of refraction. Some will still however contain unitary injection features or unitary extraction features, depending upon the detailed design and constituent structures.

In the depicted embodiment of FIG. 1, the injection features 114 are conical and appropriately designed, formed, and polished to effectively hide the associated light source 116 from direct visibility by injecting substantially all of the light. Additional examples of injection features will be described below, each of which can offer potential advantages such as ease of fabrication, support of different light source topologies, or use of more efficient or environmentally suitable optical materials.

In the depicted embodiment of FIG. 1, the extraction features 128 are conical, and extract most or all of the waveguided light from the waveguide 106. The extraction features 128 can be varied as a function of number, size, geometry, and position from the injection features 114, and position relative to each other. These parameters result in a set of extraction features 128 with a given extraction density, which represents the amount or fraction of light extracted from the waveguide over a given area. Interference with the TIR of the waveguided light is one exemplary extraction mechanism. This can be accomplished by either deflecting wave-guided light rays or by localized deviations in the waveguide surface. The extraction features 128 depicted in FIG. 1 and discussed below can utilize one or both of these mechanisms to cause light to be extracted from waveguide 106.

In one embodiment, injection features 114 can also function as extraction features when waveguided light strikes the injection feature 114 and is directed out of the waveguide 106. Similarly, light incident on extraction features 128 can be effectively injected into waveguide 106. For example, light extracted by extraction feature 128 may strike reflective layer 136 and be injected back into waveguide 106 by one or more of the extraction features 128. Any single ray can interact with a single feature or a number of features and interfaces before finally exiting as output light 132.

The exemplary embodiment depicted in FIG. 1 may have a thickness, or depth, that is relatively thin compared with some prior art direct backlights having comparable separation between adjacent light sources 116. In some embodiments, a small cavity or separation between waveguide 106 and LCD panel 102 is provided to enhance mixing, especially in embodiments that include a diffuser 103, described above. In other embodiments, no cavity is necessary since the light is adequately mixed in the waveguide 106. The distance 142 between the reflective layer 136 and the LCD panel 102 represents the optical depth of the backlight, including any included diffusers and air gaps, and can be less than the lateral separation 140 between adjacent light sources 116, particularly nearest neighboring light sources 116 having similar color characteristics, more preferably less than half the lateral separation 140, and even more preferably less than 25 percent of the lateral separation 140. This embodiment is generally more readily scalable than edge lit designs, and allows distribution of the heat generated by light sources 116 over a larger area. In another embodiment, the invention takes the form of a waveguide 106 for insertion into a conventional direct backlight having an appreciable distance 142, for example a distance 142 of 0.75 inches or greater, but in this case a high transmission diffuser 103 can be used in place of a conventional direct backlight diffuser. In yet another embodiment, distance 142 is preferably three or more times the thickness of waveguide 106, with the extra integrating volume containing an air cavity between waveguide 106 and high transmission diffuser 103. Generally, the waveguide 106 is has a locally average thickness that is substantially constant across the viewable region.

Figure 2:
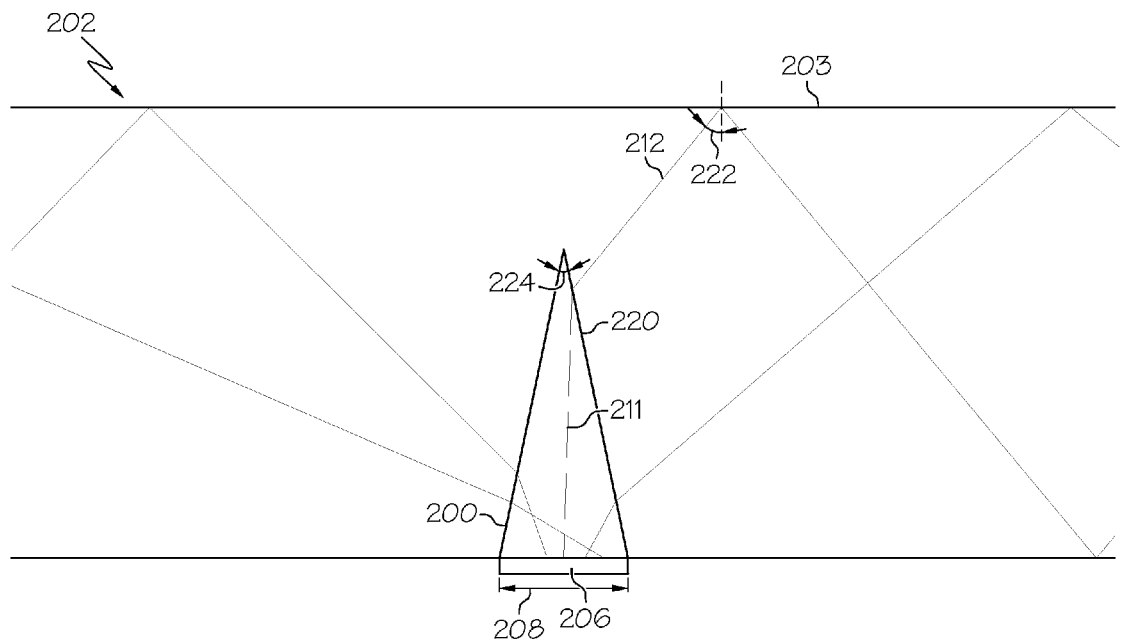
FIGS. 2-22 are views of several exemplary injection features and light sources.

The operation of an exemplary injection feature 200 of a waveguide 202 is more clearly shown in the cross-section view of FIG. 2. The waveguide 202 is a transparent optical material, and in this example, is an acrylic. Injection feature 200 is an indentation, generally conical in shape, and filled with a lower index medium such as air. The injection feature 200 couples the waveguide 202 to a light source 206. The behavior of the light rays generated by light source 206 is based on the refractive indices of the injection feature 200 and the waveguide 202 and the geometry of the injection feature 200. As such, these parameters can be manipulated to enhance the waveguided light within the waveguide 202. Particularly, the parameters can be manipulated to ensure that as much light as possible, preferably a majority of the light, and more preferably substantially all of the light from the light source, is injected and meets the conditions for TIR within the waveguide 202.

As one example, ray 211 from the light source 206 strikes surface 220 of the injection feature 200. A resulting, refracted and waveguided ray 212 can be predicted based on the angle 224 of the injection feature 200 and the respective refractive indices, which in this case is 1.0 for air and n≈1.49 for acrylic. In order to consider the ray waveguided, and therefore injected into the waveguide 202, ray 212 must exceed a certain angle at major face 203 to be reflected via TIR. TIR occurs when the angle 222 between ray 212 and the normal to major face 203 of waveguide 202 exceeds a sin(sin(90°)/n), or about 42° in this case. By setting the cone angle 224 of the injection feature such that the refracted ray 212 makes an equivalent angle with the injection surface 220, then any light from light source 206 entering the injection feature will be injected. This yields a cone angle 224 of approximately 2*(90−2*42)=12° for acrylic. The equivalent angle 224 for polycarbonate waveguide (n=1.59) would be around 24 degrees, and the cone of the injection feature 200 could be even less steep if higher refractive index materials such as high index glass were used. Larger cone angles 224 of the injection feature 200, corresponding to less sharply pointed cones, can also be used if the size of the light sources 206 is smaller than the base 208 of the injection feature 200, or if complete injection of the light is not required. Alternate transmissive materials within the injection features 200, such as clear silicone or other adhesives or polymers, with other refractive indices may be used instead of air for better index-matching, with corresponding changes in the refracted rays. Upon reflection, ray 212 continues to propagate through the waveguide 202 until the ray 212 strikes an extraction feature, as discussed in further detail below. In the present embodiment, waveguide 202 is a single extended piece, but in other embodiments waveguide 202 includes multiple smaller waveguides between which at least a portion of the waveguided rays can pass.

FIGS. 3-22 depict several exemplary injection features and light sources that can be used in the backlight systems described herein to inject, either primarily or completely via refraction, a majority or more preferably substantially all of the light from the light source such that the light remains confined within the waveguide due to TIR until the light is extracted by an extraction feature. The injection features can be cast, molded, or otherwise formed in or adjacent the waveguide.

Figure 3:
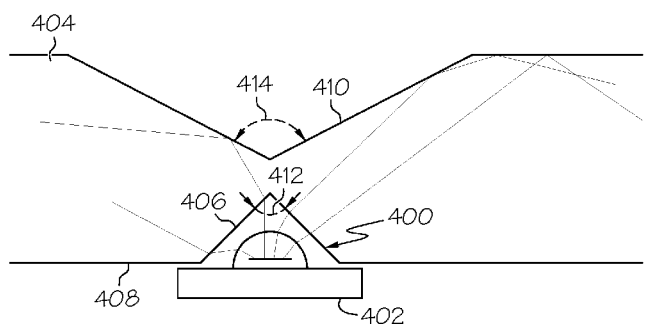

As one example, FIG. 3 is a cross-sectional view of an exemplary injection feature 400 coupling light source 402 to a waveguide 404. The injection feature 400 includes a first cone 406 on a first major face 408 of the waveguide 404 and a second cone 410 on a second major face 418 of the waveguide 404. The opposing first and second cones 406 and 410 enable a broader cone angle as compared to, for example, the embodiment depicted in FIG. 2. The broader cone angles 412 and 414 may enable a relatively thinner waveguide 404. The light source 402 is a non-flat LED at least partially extending into the first cone 406, although in other embodiments, the light source 402 is a flat, side-emitting, Lambertian, or directional LED, or other source having a different source geometry or angular output profile.

Figure 4:
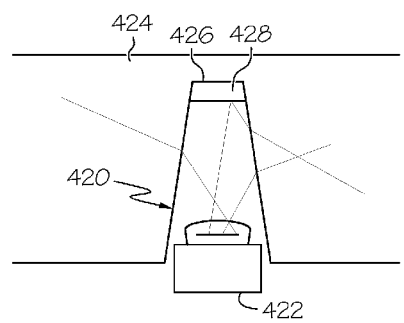

FIG. 4 is a cross-sectional view of another exemplary injection feature 420 coupling light source 422 to a waveguide 424. In this example, the injection feature 420 is tapered or conical with a truncated end 426, which enables a relatively thin waveguide 424. To minimize leakage of non-injected light directly out of the waveguide 424, an insert 428, either a specular or diffuse reflector, may optionally be provided within the injection feature 420 at the truncated end 426. In other embodiments, the insert 428 can be white, partially transmissive, adhesive, paint, fill material, an LED cap, and/or a tinted underside.

Figure 5:
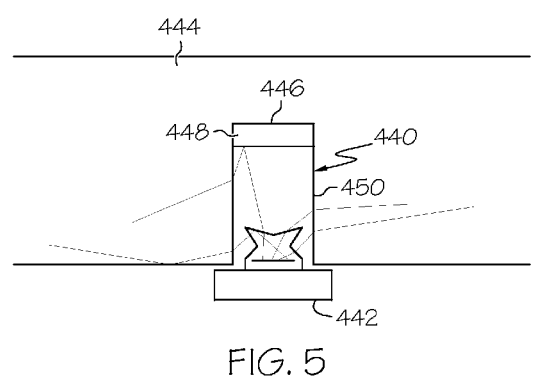

FIG. 5 is a cross-sectional view of another exemplary injection feature 440 coupling light source 442 to a waveguide 444. In this example, the injection feature 440 is cylindrical with an optional reflector or masking element 448 at one end 446. The light source 442 is a side emitting LED, which may minimize the amount of light that would reach end 446 or element 448 prior to injection through the side wall 450.

Figure 6:
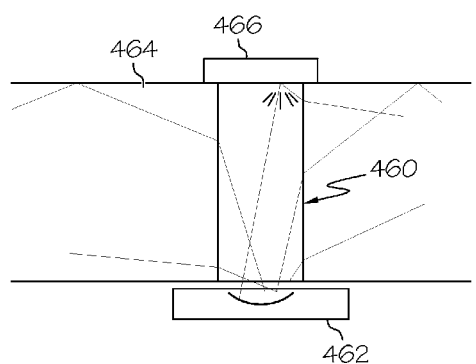

FIG. 6 is a cross-sectional view of yet another exemplary injection feature 460 coupling light source 462 to a waveguide 464. In this example, the injection feature 460 is a cylindrical through hole, which is relatively simple to fabricate in that no angular walls within the waveguide 464 are necessary. A mask 466, either reflective, scattering, absorbing or a combination thereof is optionally positioned at an end of the injection feature 460 opposite the light source 462. In various embodiments, the mask 466 can be a white sheet with cutouts, paint, screen printing, tape, adhesive, patterned sheets, and/or partially transmissive or tinted materials.

Figure 7:
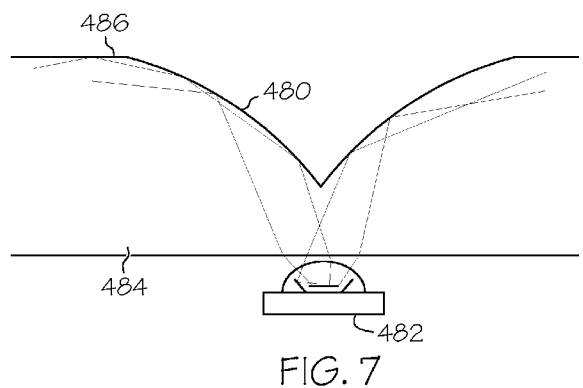

FIG. 7 is a cross-sectional view of another exemplary injection feature 480 coupling light source 482 to a waveguide 484. In this example, the injection feature 480 is a curved conical shape on a major face 486 of the waveguide 484 opposite the light source 482. In various embodiments, the injection feature 480 can be curved, multi-faceted or otherwise complex. Similarly, the simpler conical or cylindrical structures of other embodiments can alternately be curved or multi-faceted as well. While it is preferred for the embodiment of FIG. 7 that light source 482 has a somewhat directional output, this is not required. The light source 482 may also include internal side reflectors or other optical mechanisms to assist the directional output.

Figure 8:
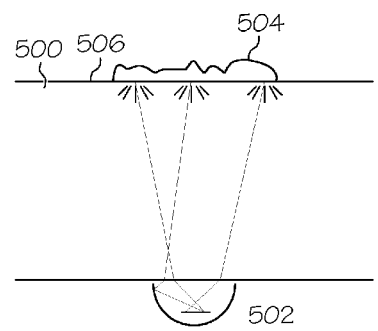

FIG. 8 is a cross-sectional view of an exemplary embodiment in which light is directed directly into a waveguide 500 by a light source 502. In this example, a backscattering layer 504, such as white pigment or paint, is provided on a major face 506 opposite the light source 502 to scatter and reflect the light such that a substantial portion of it is injected and waveguided in a lateral direction. Light source 502 is preferably a directional light source, although this is not required.

Figure 9:
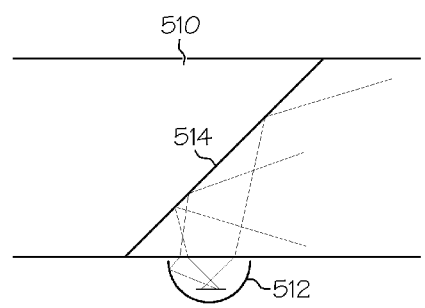

FIG. 9 is a cross-sectional view of another exemplary embodiment in which light is directed into a waveguide 510 by a light source 512. In this example, an immersed oblique reflective structure 514 serves as the injection feature, injecting the light such that it is waveguided in a lateral direction.

Figure 10:
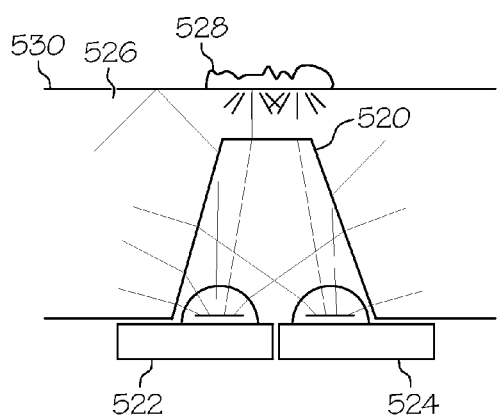

FIG. 10 is a cross-sectional view of another exemplary embodiment and includes an injection feature 520 that injects light from two light sources 522, 524 into a waveguide 526. The injection feature 520 in this example is a truncated cone, and a masking layer 528 is provided to assist the injection feature 520 in injecting the light into the waveguide 526. The masking layer 528 can be applied, for example, by screen printing a diffuse white or specular layer over a major face 530 of the waveguide 526 opposite the light sources 522, 524.

Figure 11:
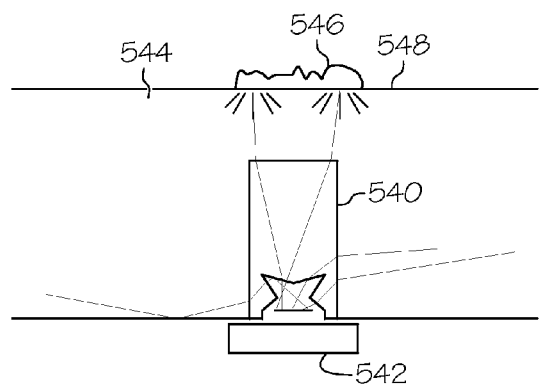

FIG. 11 is a cross-sectional view of another exemplary embodiment and includes an injection feature 540 that injects light from a light source 542 into a waveguide 544. In this example, the injection feature 540 is cylindrical and the light source 542 is a side-emitting LED. The masking layer 546 can be provided on a major face 548 of the waveguide 544 opposite the light source 542.

Figure 12:
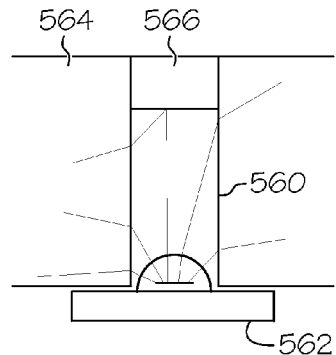

FIG. 12 is a cross-sectional view of another exemplary embodiment and includes an injection feature 560 that injects light from a light source 562 into a waveguide 564. In this example, the injection feature 560 is cylindrical. A plug 566 is provided in the injection feature 560 opposite the light source 562 to block at least a portion of the light.

Figure 13:
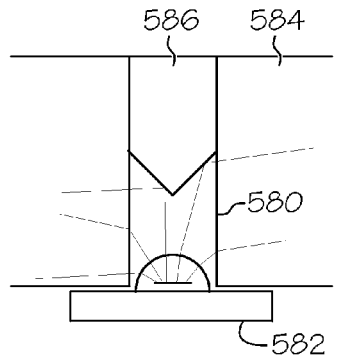

FIG. 13 is a cross-sectional view of another exemplary embodiment and includes an injection feature 580 that injects light from a light source 582 into a waveguide 584. In this example, the injection feature 580 is cylindrical. A plug 586 can be provided in the injection feature 580 opposite the light source 582 to block at least a portion of the light. In contrast to the plug 566 in FIG. 12, the plug 586 has beveled or otherwise angled surfaces that may improve injection into the waveguide.

Figure 14:
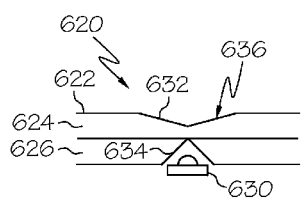

FIG. 14 is a cross-sectional view of another exemplary backlight system 620 that includes a waveguide 622 coupled to a light source 630 by opposing portions 632, 634 of an injection feature 636. The waveguide 622 includes a first substrate 624 and a second substrate 626. The first substrate 624 and the second substrate 626 are optically bonded together in a manner such that the substrates 624 and 626 are substantially index-matched, meaning that there is not a low index gap such as an air gap between them. This results in at least a majority of any waveguided light being passed back and forth freely between substrates 624 and 626. Such bonding can be achieved with optical adhesives or by a variety of other methods, such as thermal, mechanical or chemical processes. Other multiple substrate embodiments comprise one or more other injection feature implementations described above.

Figure 15:
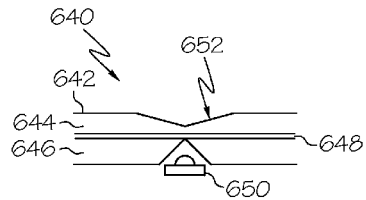

FIG. 15 is a cross-sectional view of another exemplary backlight system 640. The backlight system 640 includes a waveguide 642 coupled to a light source 650. The waveguide 642 includes a first substrate 644 and a second substrate 646. The first substrate 644 may capture at least a portion of any rays from the light source 650 that pass through the second substrate 646 without being injected. The waveguide 642 also includes a gap 648 between the first and second substrates 644, 646, although localized optical bonding or contact can occur in selected locations, using structures similar to those described in reference to FIG. 14. Extraction features, such as those described in reference FIG. 1 or below, can be arranged in one or both of the substrates 644, 646.

Figure 16:
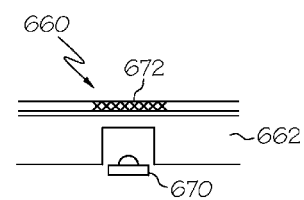

FIG. 16 is a cross-sectional view of another exemplary backlight system 660. The backlight system includes a waveguide 662 coupled to a light source 670. An attenuating mask layer 672 overlays the waveguide 662 to block or attenuate a direct path from the light source 670 out of the waveguide 662.

Figure 17:
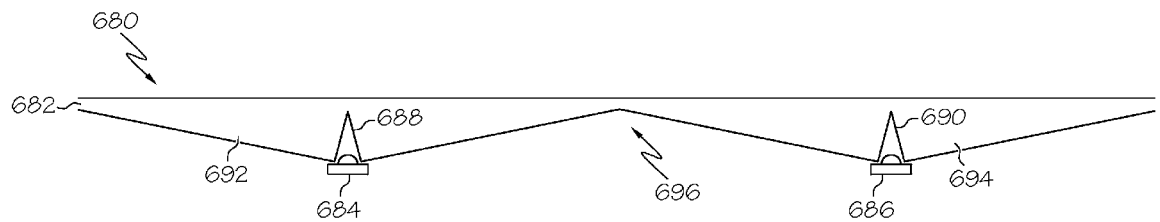

FIG. 17 is a cross-sectional view of yet another exemplary backlight system 680. The backlight system 680 includes a waveguide 682 respectively coupled to light sources 684, 686 with injection features 688, 690. Although still substantially parallel, the waveguide 682 includes wedged portions 692, 694 that open up space 696 in between. As a result, the waveguide 682 can have a relatively smaller average thickness and weight and/or the ability to accommodate additional features within the space 696.

Figure 18:
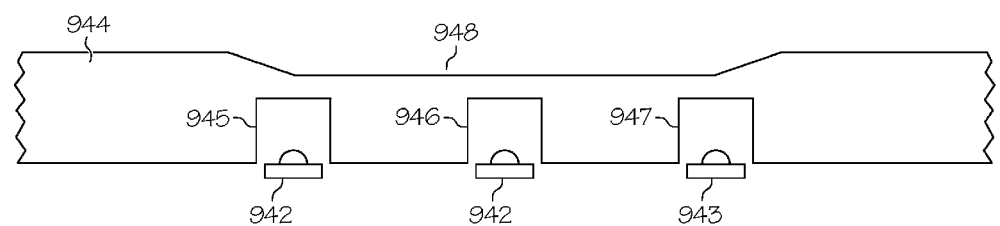
Figure 19:
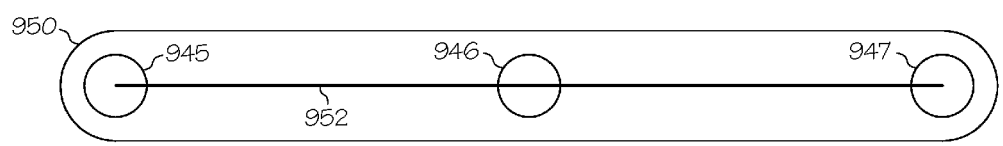

FIG. 18 is a cross-sectional view of another exemplary backlight system 940 that includes light sources 941-943 coupled to a waveguide 944. In this embodiment, light is injected by a combination of individual injection features 945-947 and a shared injection feature 948. The injection feature 948 has a top portion 950 and a tapered bottom portion 952, which is better shown in the top plan view of FIG. 19.

Figure 20:
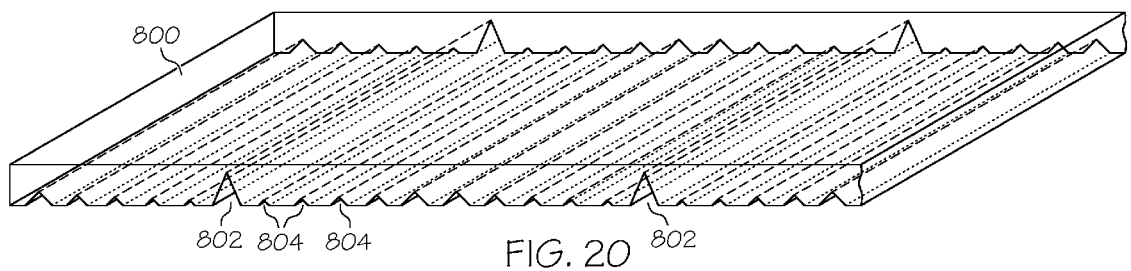

The majority of the injection embodiments thus far have been described in the context of being symmetrical around a vertical axis of symmetry, such as conical or cylindrical. In other embodiments, related structures may have alternate symmetries, for example pyramidal or rectangular, or even be fundamentally asymmetric, for example with an upper portion being slightly offset with respect to the bottom portion. Yet another exemplary symmetry variant is shown in FIG. 20. FIG. 20 is an isometric view of a waveguide 800 suitable for use in the backlight systems described herein. The waveguide 800 includes a plurality of injection features 802 and extraction features 804. In this embodiment, the injection features 802 can accommodate linear light structures such as a fluorescent lamp or rows of LEDs distributed across the viewable region. The use of linear injection features 802 or extraction features 804 may result in the waveguide 800 having an asymmetric light emitting pattern. In alternate embodiments, injection features 802 can accommodate a combination of linear and point light sources such as the LEDs described above. In other embodiments, each of the injection features disclosed above can be extended in a manner such as this, or the various types and orientations of all of the injection features and extraction features may be mixed and matched within or on the waveguide.

Figure 21:
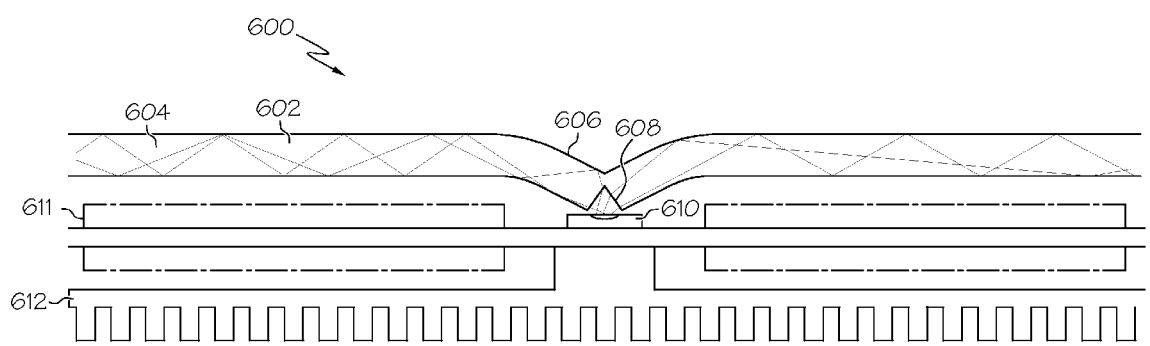

FIG. 21 is a cross-sectional view of another exemplary backlight system 600. The backlight system 600 includes a waveguide 602 coupled to a light source 610. The waveguide 602 includes flat portions 604 and obliquely angled portions 606. A conical injection feature 608 in the angled portion 606 couples the waveguide 602 to a light source 610. The waveguide 602 has a generally constant thickness throughout the viewable region and may be thinner than other embodiments, allowing for reduced waveguide weight. The generally constant average thickness improves compatibility with certain manufacturing processes such as compression molding, since removal of material is unnecessary in forming the unitary refractive structure. Only local material flow is required to form the detailed optical surfaces. The embodiment is shown with a flat emitter, but as is the case with the other embodiments, nearly any emitter topology can be utilized. Moreover, any suitable extraction features (not shown) can be used. In another embodiment, the injection feature 608 has the cross-section shown in a first axis, and extends linearly in a second axis, such as was shown for injection feature 802 in FIG. 20. In yet another embodiment, waveguide 602 is formed in discrete sections, for example the right and left sides in FIG. 21, which are abutted or joined above light source 610.

The geometry of the flat and angled portions 604, 606 of the waveguide 602 accommodates additional circuitry 611 between the light source 610 and adjacent light sources (not shown). In some embodiments, all interface and drive circuitry for an LCD system resides on the same plane or board as the one or more light sources 610. The backlight system 600 further includes a distributed heat sink 612 for effectively spreading and removing the heat. The heat sink 612 is correspondingly scalable with the circuitry 611 and light source 610.

Figure 22:
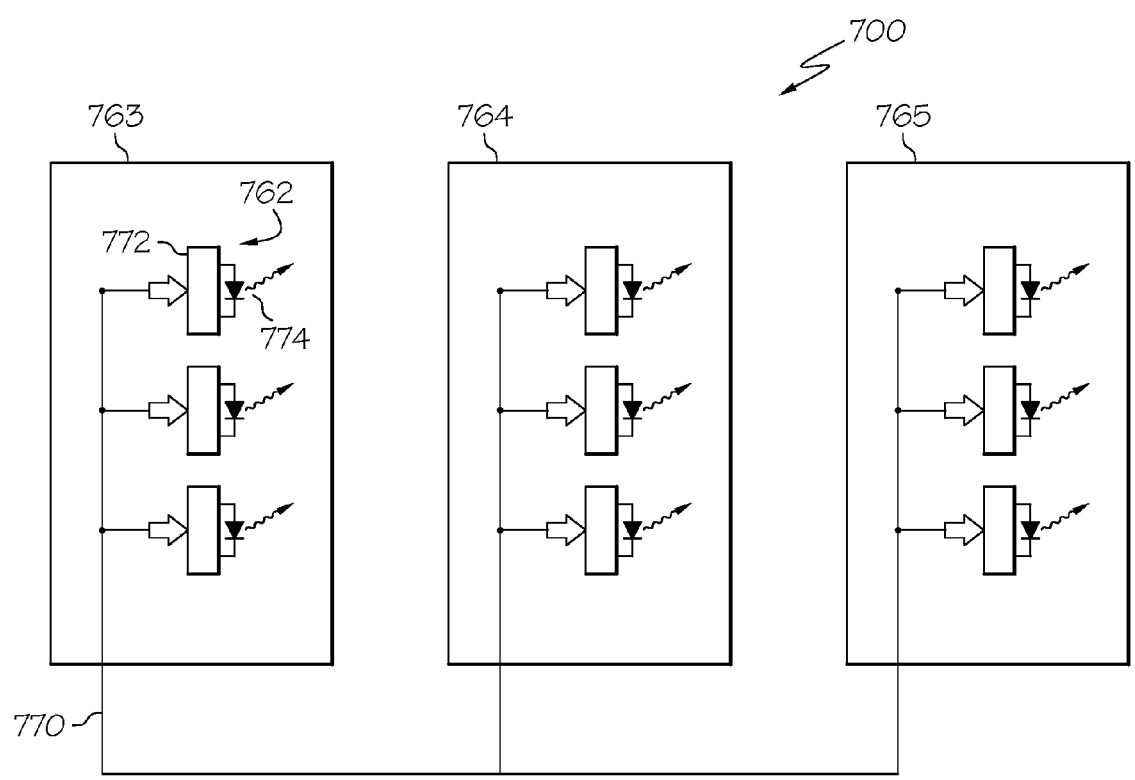

FIG. 22 illustrates a portion of a backlight system that can be used in conjunction with the injection features described above. Particularly, FIG. 22 is a block diagram of exemplary light source circuitry 700 used to drive the light sources of the backlight systems described herein. Light sources 762 are grouped into three groups 763, 764, 765. Each light source 762 includes a driver 772 coupled to an LED 774. Each driver 772 couples to a common signal and power bus connection 770 allowing complex driving and distribution of the supplied current. The light sources 762 can be dynamically driven as individual LEDs, as groups 763-765, or collectively as an entire system. The drive circuit 772 is optionally contained on a circuit board with the LEDs 758 and resides within the lateral gaps between adjacent LEDs 774. Light spreads uniformly between the groups 763-765, which can represent a regular array of sources, distinctly separate source modules injecting light into a larger waveguide, or any other suitable physical layout. This embodiment also enables the suppression of hot spots at the LEDs 774 as well as at distinct source modules. In another embodiment, the LEDs 774 in groups 763, 764, 765 are driven as one or more series strings of LEDs.

In a variation of the embodiment of FIG. 22, some of the LEDs 774 can be replaced with diodes which are non-emissive, or with passive resistive loads. By selectively driving the non-emissive loads to generate heat, the temperature of the backlight can be raised or maintained independently of the brightness setting. This can be useful for maintaining consistent display performance or even for warming a display panel under cold environment conditions, and the effectiveness of the technique is enhanced by the reduced distance and distributed arrangement of the emissive and non-emissive sources of heat. In this variation, either a complex or simplified drive scheme can be utilized. The non-emissive loads can be driven by a separate power source capable of being modulated to adjust the desired rate of heat generation. If desired, thermal conductivity can be included as one of the relevant parameters considered during the process of selecting materials for a corresponding waveguide and other backlight components in order to minimize temperature differences between the display panel and the backlight system.

Figure 23:
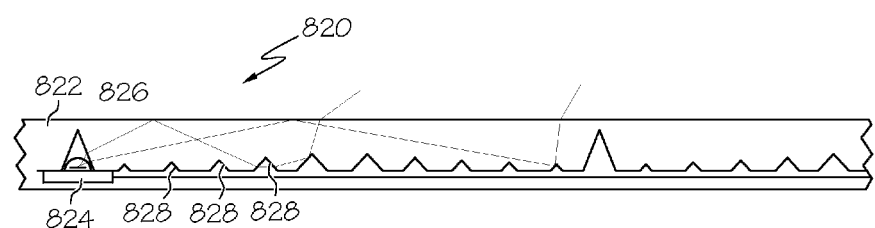
FIGS. 23 and 24 are cross-sectional views of exemplary backlight systems.
Figure 24:
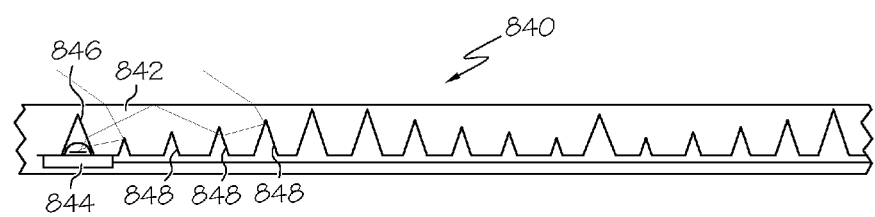
Figure 25:
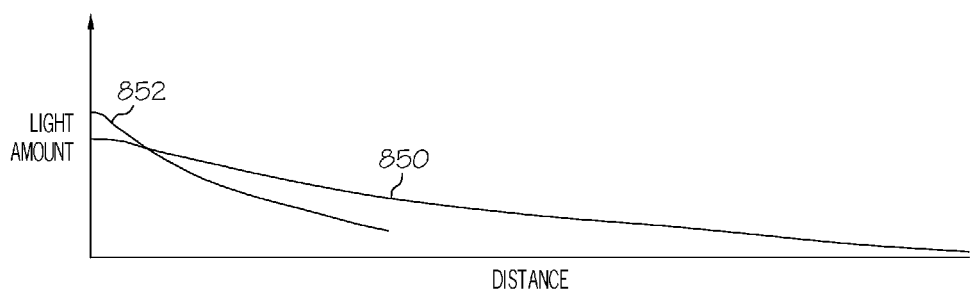
FIG. 25 is a graph illustrating the spread function of the backlight systems of FIGS. 23 and 24.

While FIGS. 4-22 illustrate various types of light sources and injection features, FIGS. 23-27 illustrate several techniques for extracting waveguided light out of the waveguide. For example, FIG. 23 is a cross-sectional view of a backlight system 820 having a waveguide 822 coupled to a light source 824 by injection feature 826, and FIG. 24 is a cross-sectional view of another backlight system 840 also having a waveguide 842 coupled to a light source 844 by injection feature 846. The backlight system 820 of FIG. 23 has relatively small extraction features 828 as compared to the extraction features 848 of the backlight system 840 of FIG. 24. The relative sizes of the extraction features 828, 848 result in differences between the spatial extent of the spread function of the light in a lateral direction, which is illustrated by the graph of FIG. 25, as the larger extraction features 848 extract more light than the smaller but comparably spaced extraction features 828. In terms of extraction density, each of backlight system 820 and 840 has an extraction density which varies spatially, but backlight system 840 has a generally higher extraction density than backlight system 820. In these embodiments, this is because the extraction features are larger and more effective while the spacing of the extraction features is comparable. Line 850 in FIG. 25 represents the amount of light waveguided and extracted from the waveguide 822 as a function of the distance from the light source 824, and line 852 in FIG. 25 represents the amount of light waveguided and extracted from the waveguide 842 as a function of the distance from the light source 844. As such, backlight system 820 has a more intense amount of light at and immediately surrounding the light source 824, but the backlight system 840 more evenly distributes light from light source 844 over a greater area. The effective spread function is therefore determined in large part by the extraction density of the detailed extraction feature design and spacing, and can impact redundancy, color mixing effectiveness, and further topics such as dynamic backlight techniques. The wider spread function represented by line 850 is an indication that extraction features 828 have a generally lower extraction density than extraction features 848 which result in the narrower spread function represented by line 852.

Figure 26:
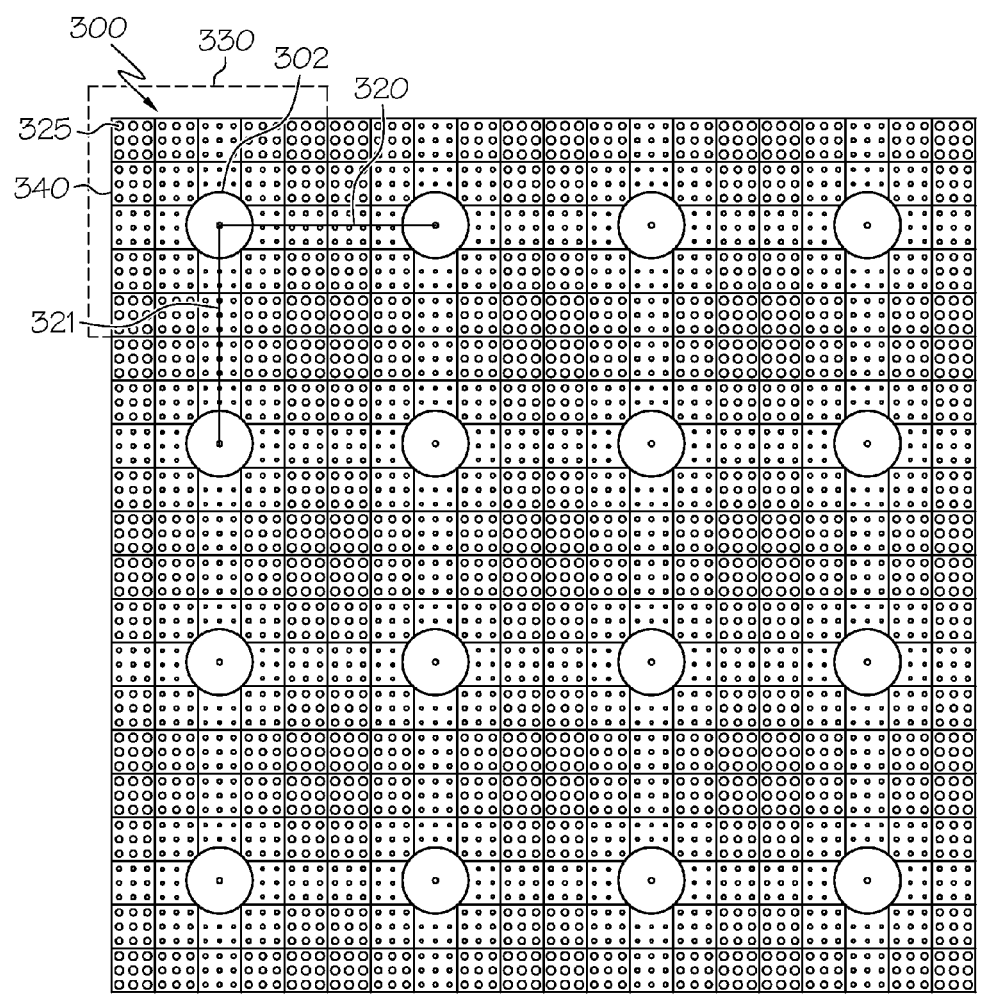
FIGS. 26 and 27 are planar views of exemplary backlight systems.

FIG. 26 is a planar view of an exemplary backlight system 300 and illustrates the manipulation of the extraction density and the related spread function. In this view, injection features 302 are represented by relatively large circles. Extraction features 325 are represented by smaller circles. The injection features are arranged in a regular square array with equal separation in both horizontal and vertical directions, e.g., horizontal distance 320 and vertical distance 321, but this arrangement is not necessary. The pattern of injection features 302 and extraction features 325 could be asymmetric rectangular, hexagonal, random, or any other two dimensional array.

The injection features 302 and extraction features 325 are arranged into regions 330. The regions 330 are further divided into one or more subregions 340. While distinct subregions are depicted for clarity of explanation, it should be understood that continuously varying distributions of extraction density is a more general case. In the depicted embodiment, the backlight system 300 includes sixteen regions 330, each with one injection feature 302, and each region 330 includes twenty-five subregions 340, one of which coincides with injection feature 302. The subregions 340 are defined by one or more extraction features 325, in this case, nine extraction features 320. Typically, the extraction features 325 of a particular subregion 340 have a particular extraction density. As noted above, extraction density corresponds to the degree by which light is extracted by a particular area of extraction features. The extraction density can be varied, for example, by adjusting the feature density, feature size, feature shape or type of extraction features, and as described previously, facilitates the capability of making the output uniform for a wide variety of LED configurations and waveguide materials. Each of the regions 330 and subregions 340 can have varying extraction densities. In this embodiment, the extraction densities of the subregions 340 are manipulated such that light from a respective injection feature 302 spreads evenly throughout the region 330, but without significant spread into adjacent regions 330. In other words, the extraction feature topology provides a relatively symmetric and localized spread function.

In one embodiment, the injection features 302 can contribute to an injection leakage density, which is a measure of how much light transmitted directly through the waveguide without being injected. Certain embodiments described herein attempt to minimize the injection leakage density. However, in other embodiments, the extraction density can be tuned to the injection leakage density such that the output light is uniform.

Figure 27:
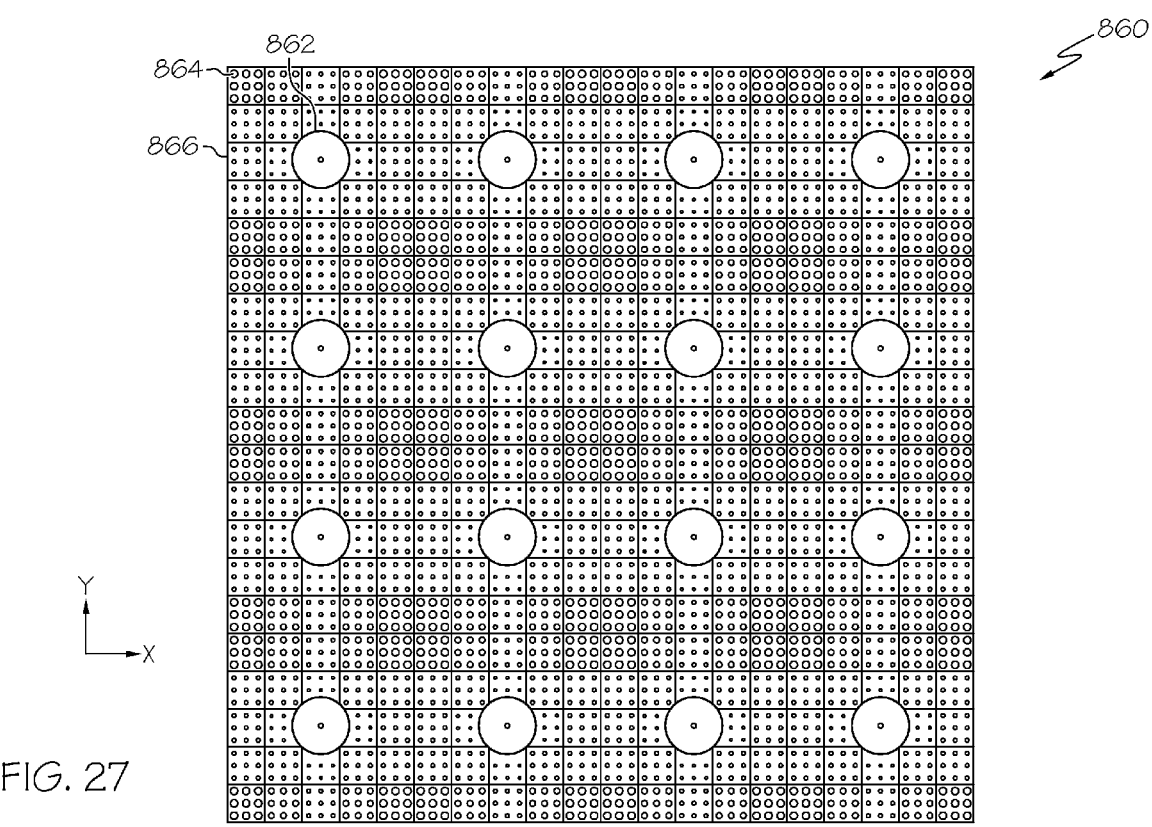

FIG. 27 is a plan view of an exemplary backlight system 860. The backlight system 860 has a plurality of injection features 862 and extraction features 864 distributed through a waveguide 866. The extraction features 864 vary in size throughout the waveguide, as indicated by the relative size of the dots representing the extraction features 864. In this embodiment, the topology of the extraction features 864 has an asymmetrical design as compared to the more symmetrical design of FIG. 26. The extraction features 864 in an x-direction are relatively constant while the extraction features 864 in a y-direction are more varied. As a result, the light injected from injection features 862 extends to a greater extent (i.e., a broader spread function) in the x-direction than in the y-direction. This can be particularly useful in applications in which mixing is desired along the x-direction, but not the y-direction, such as dynamic backlighting techniques that synchronize the backlight with the row or column update timing progression or to conserve power or enhance visual contrast by spatially modulating the backlight system 860. In an embodiment of the present invention, an asymmetrical spread function embodiment is combined with the independently dynamic drive embodiment as described in FIG. 22, facilitating dynamically addressable rows of illumination in a reduced depth configuration. In another embodiment, the symmetrical but narrower spread function embodiment of FIG. 26 are combined with the embodiment of FIG. 22, facilitating dynamically addressable regions of a compact backlight. In yet another embodiment, a broad spread function is utilized in both x and y directions to facilitate enhanced mixing of light from a plurality of LEDs.

Figure 28:
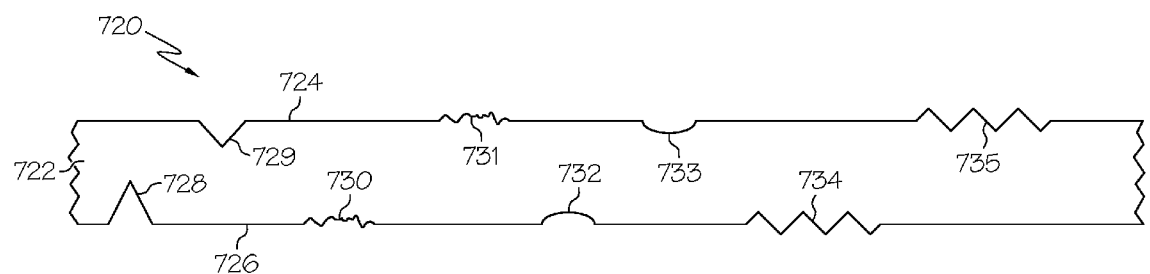
FIGS. 28-31 are cross-sectional views of several exemplary extraction features.

FIGS. 28-31 illustrate various types of extraction features that can be incorporated in the backlight systems discussed herein. The extraction features can be cast, molded, or otherwise formed. FIG. 28 is cross-sectional view of a portion of a backlight system 720 having a waveguide 722 with top and bottom major faces 724, 726 and a plurality of extraction features 728-735. Extraction features 728, 729 are wedge shaped and are formed internal to the bottom major face 726 and top major face 724, respectively. Extraction features 730, 731 are irregular and formed on the bottom major face 726 and top major face 724, respectively. Extraction features 732, 733 are dimple shaped and formed internally on the bottom major face 726 and the top major face 724, respectively. Extraction features 734, 735 are a series of regular wedge shaped or prismatic groove features formed in the bottom major face 726 and the top major face 724. While only a first cross-section is shown, it should be understood that the other cross-sections can be symmetrical, can be different, or can comprise linear structures as described above. Making the physical cross-sections different, for example slightly broadened in one axis, or the fully extended example of FIG. 20, allows additional flexibility in achieving uniform output, since the extraction features then have varying angular cross-sections. This can be leveraged to provide extraction densities that depend upon orientation relative to the ray propagation direction as well as spatial location.

Figure 29:
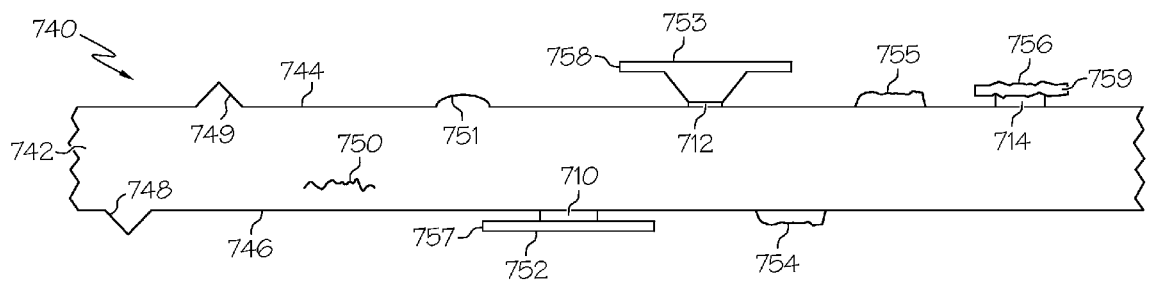

As further examples of extraction features, FIG. 29 is a cross-sectional view of a portion of a backlight system 740 having a waveguide 742 with top and bottom major faces 744, 746 and a plurality of extraction features 748-756. Extraction features 748, 749 are wedge shaped and extend from the bottom major surface 746 and the top major surface 744. Extraction feature 750 is an internal, irregular inclusion in the waveguide 742. Extraction feature 751 is dimple shaped and extends from the top major surface 744. Extraction feature 752 comprises a localized region in which a diffusely reflecting layer 757, such as reflective layer 136 in FIG. 1, is locally index-matched by optical bond 710 to major surface 746 of waveguide 742. Optical bond 710 can be, for example, a clear adhesive layer such as an applied and cured polymer or a patterned transfer adhesive layer. Extraction feature 753 includes an optically structured upper layer 758 which is locally index-matched to top major surface 744 by optical bond 712. Extraction features 754, 755 are externally applied diffusing layers on the bottom major surface 746 and the top major surface 744. A preferred material for extraction feature 754 or 755 is highly reflective and scattering white paint or a related structure. Extraction feature 756 is another example having a diffuser layer 759 with a diffuse surface texture and locally index-matched to top major surface 744 by optical bond 714.

Figure 30:
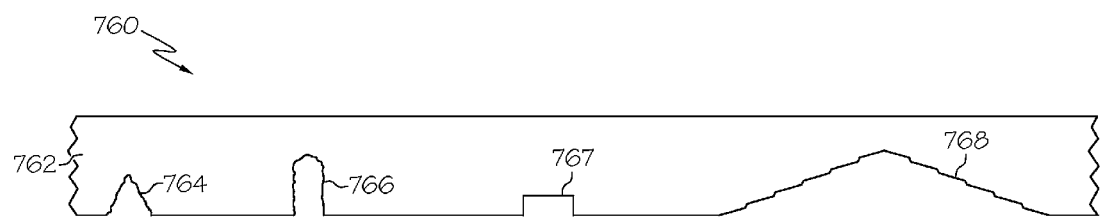

FIG. 30 is a cross-sectional view of a portion of a backlight system 760 with more examples of various types of extraction features 764-768. Extraction feature 764 is conical shaped and unpolished. Extraction feature 766 is more cylindrical than extraction feature 764 and is also unpolished. Extraction feature 767 has a profile well-suited to extract light toward a scattering reflector such as reflector 136 of FIG. 1. By keeping the depth of the extraction feature 767 small compared with its width, only a small fraction of the extracted and diffusely reflected light will be re-injected through the side walls. Extraction feature 768 is an example of a stepped wedge light extraction structure.

Figure 31:
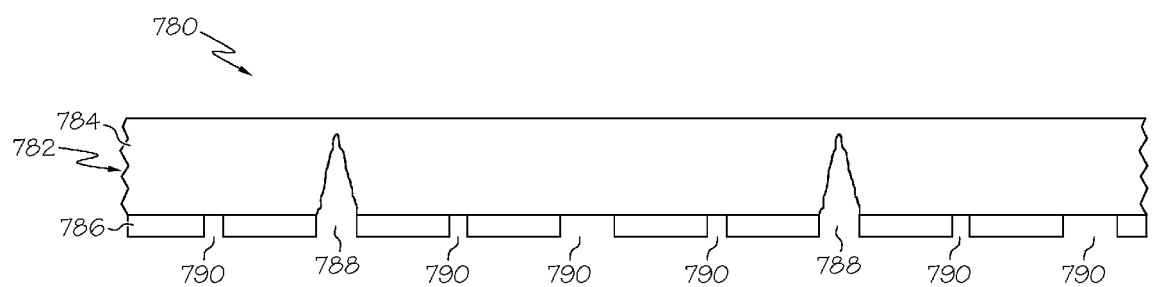

FIG. 31 is a cross-sectional view of a portion of yet another backlight system 780. In this embodiment, the waveguide 782 includes a top portion 784 and a bottom portion 786. The top portion 784 and bottom portion 786 are bonded together by an index matching adhesive or other mechanism. The bottom portion 786 can be considered, for example, a secondary layer or film. Injection features 788 are arranged throughout the waveguide 782 to couple the waveguide 782 to a light source (not shown), and extraction features 790 are arranged to direct light out of the waveguide 782. The injection features 788 are formed in both the top portion 784 and bottom portion 786 of the waveguide while the extraction features 790 are formed on the bottom portion 786. Light extracted from waveguide 782 by extraction features 790 may be redirected by a rear reflector, such as reflective layer 136 of FIG. 1.

FIGS. 32-37 illustrate exemplary backlight systems with light sources having different spectral or color characteristics. For example, full color may be achieved via white light sources (W), a mixing of color light sources such as red, green and blue (RGB), or by mixing both white and colored light sources in varying combinations, such as RW, RBW, RGBW and so forth. Embodiments disclosed herein allow effective mixing of any number or combination of light source contributions while maintaining a low profile or depth and without a substantial extension of components beyond the viewable region. In addition, the number of light sources for each color component can be different, allowing considerable flexibility in adjusting the color gamut, chromaticities or detailed spectral properties of the backlight and resulting display system.

Figure 32:
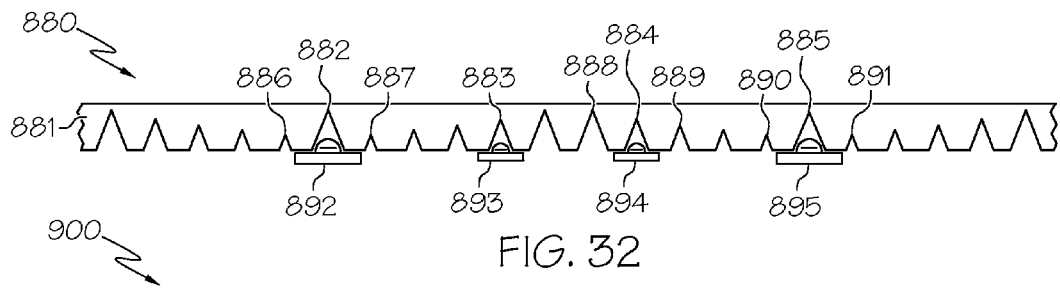
FIGS. 32-36 are views of backlight systems with light sources having differing spectral or color characteristics.

FIG. 32 is a cross-sectional view of an exemplary backlight system 880 that includes a waveguide 881, and a plurality of injection features 882-885 and extraction features (e.g., 886-891) that respectively inject and then extract light generated by light sources 892-895. Light source 893 is a red light source, and light source 894 is a blue light source. Light sources 892, 895 are white light sources. In this example, red and blue light from light sources 893, 894 is injected through the relatively smaller injection features, e.g., injection features 883, 884. The white light from light sources 892, 895 is injected through the larger injection features, e.g., injection features 882, 885. Extraction density is varied across the extraction features, for example in the region from extraction feature 890 to extraction feature 888, to yield substantially uniform light output in conjunction with any leakage from white light injection, for example light source 895 and injection feature 885. Injection feature 884 in this embodiment is acting as both an injection feature and an extraction feature, allowing colored light to be mixed in with other light in an effective manner.

Figure 33:
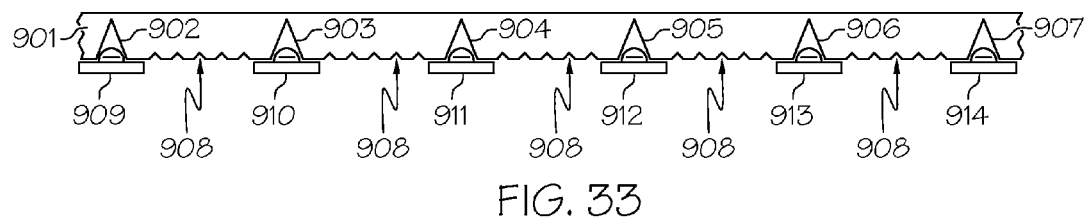

FIG. 33 is a cross-sectional view of another exemplary backlight system 900 that includes a waveguide 901, and a plurality of injection features 902-907 and extraction features 908 that respectively inject and then extract light generated by light sources 909-914. In this embodiment, the light sources 909-914 can be a combination of various colors, such as red, green, blue and white. The extraction features 908 have a lower profile, and in particular a lower extraction density, than some other embodiments to facilitate a broader spread function and an enhanced mixing of the light sources 909-914. The spread function in the orthogonal direction may either be comparably broad to facilitate mixing in that direction as well, or may be deliberately shorter as discussed above, and as was seen in the embodiment of FIG. 27, if color mixing is less important in the second axis. In another embodiment, the multicolor sequence of light sources 909-914 can be situated under a linear injection structure, for example injection feature 802 of waveguide 800 in FIG. 20.

Figure 34:
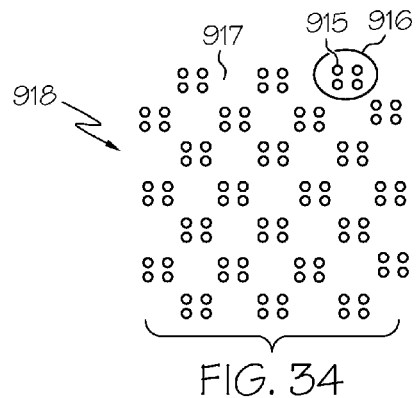

In one embodiment, such as shown in the plan view of FIG. 34, light sources 915 can be grouped into clusters 916 distributed across an active area region 917 of a display system 918. In a further embodiment, each cluster 916 contains one LED 915 of each color, for example R, G, B and W. In yet a further embodiment, each cluster 916 is injected into a waveguide such as waveguide 526 of FIG. 10 via injection feature 520 of FIG. 10.

Figure 35:
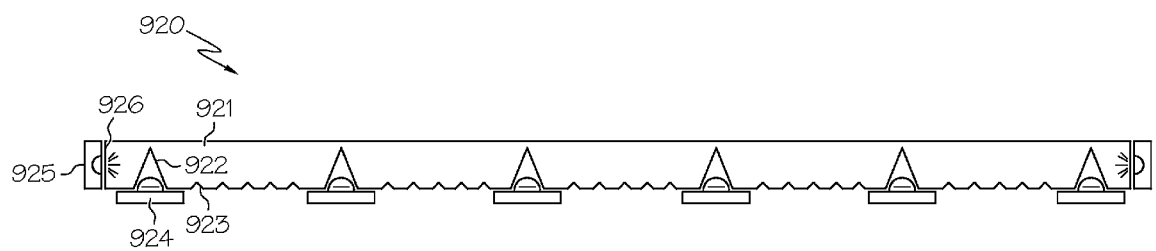

FIG. 35 is a cross-sectional view of another exemplary backlight system 920 that includes a waveguide 921. Injection features 922 and extraction features 923 respectively inject and then extract light generated by light sources 924. The backlight system 920 further includes additional light sources 925 that inject light through one or more edges 926 of the waveguide 921.

Figure 36:
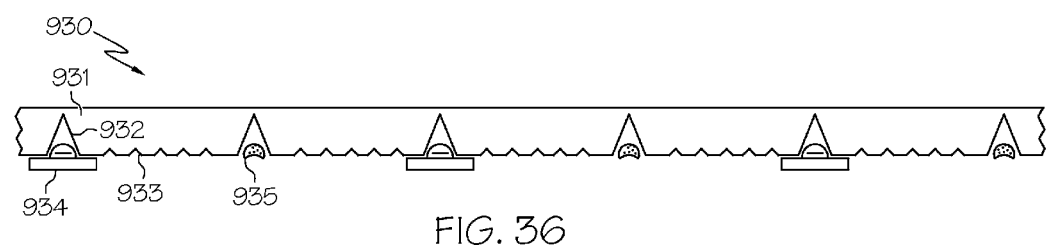

FIG. 36 is a cross-sectional view of another exemplary backlight system 930 that includes a waveguide 931. Injection features 932 and extraction features 933 respectively inject and then extract light generated by light sources 934. The backlight system 930 further includes light absorbing features 935 to tune a particular portion of spectrum and chromaticity of the backlight system 930 without introducing uniformity concerns.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A backlight system for a liquid crystal display, comprising:
   a substantially planar, refractive waveguide including a first major face and a second major face opposite the first major face, the waveguide including a viewable region corresponding to a viewable area of the liquid crystal display;
   a first light source positioned proximate to the second major face and within the viewing region for producing light;
   an injection feature proximate to one or more of the second major face and the first major face and within the viewing region to optically couple the light into the waveguide such that the light becomes waveguided light; and
   a plurality of extraction features proximate to one or more of the second major face and the first major face and within the viewing region to optically couple the waveguided light out of the waveguide,
   the backlight system having an optical depth and further comprising
      a reflective layer proximate to the second major face;
      a transmissive diffuser proximate to the first major face; and
      a second light source having a similar color characteristic to the first light source, wherein the optical depth is less than a lateral separation between the first light source and the second light source.

2. The backlight system of claim 1, wherein a plurality of the first light sources and a plurality of the injection features are positioned within the viewable region, the plurality of the injection features being interspersed amongst the plurality of the extraction features.

3. The backlight system of claim 2, wherein the plurality of the first light sources contains light sources having different color characteristics, and wherein the light of different color characteristics are at least partially mixed within the waveguide.

4. The backlight system of claim 1, wherein substantially all of the light from the first light source is optically coupled into the waveguide such that it becomes waveguided light.

5. The backlight system of claim 1, wherein the injection feature is a unitary structure.

6. The backlight system of claim 5, wherein the injection feature has a conical shape, and wherein substantially all light from the first light source is injected by the injection feature.

7. The backlight system of claim 1, wherein the waveguide is a unitary refractive waveguide.

8. The backlight system of claim 1, wherein the injection feature includes a first portion on the first major face and a second portion on the second major face.

9. The backlight system of claim 8, wherein the injection feature includes a first conical indentation extending from the first major face and a second conical indentation extending from the second major face.

10. The backlight system of claim 1, wherein the waveguide has a locally averaged thickness that is substantially constant across the viewable region.

11. The backlight system of claim 1, further comprising a mixing cavity with a separation between the first major face and the transmissive diffuser.

12. The backlight system of claim 1, wherein the plurality of extraction features are arranged in a first group and a second group adjacent to the first group, and wherein the waveguide includes a first area corresponding to the first group of extraction features and a second area corresponding to the second group of extraction features, and wherein the first group of extraction features defines a localized spread function such that light in the first area spreads substantially evenly through the first area without substantially spreading into the second area.

13. The backlight system of claim 1, further comprising a plurality of the first light sources having a first color and a plurality of third light sources, each of the third light sources having a second color, different than the first color, and a plurality of first injection features having a first size and a plurality of second injection features, each of the second injection features having a second size, different than the first size, wherein each of the first injection features is configured to inject light from the plurality of the first light sources and each of the second injection features is configured to inject light from the plurality of third light sources.

14. The backlight system of claim 1, further comprising a plurality of the first light sources arranged into source groupings configured to provide light to the waveguide, the source groupings being individually driven and smaller than the waveguide.

15. The backlight system of claim 1, wherein the waveguide is formed by discrete waveguide sections.

16. The backlight system of claim 1, further comprising a third light source adjacent to, and forming a gap with, the first light source, and circuitry positioned within the gap between the first light source and the third light source.

17. The backlight system of claim 1, further comprising light absorbing features configured to tune backlight chromaticity by absorbing a portion of visible spectrum from the first light source.

18. The backlight system of claim 1, further comprising a non-emissive device proximate to the second major face and configured to generate heat.

19. A backlight system for a liquid crystal display, comprising:

a substantially planar waveguide including a first major face and a second major face opposite the first major face, the waveguide including a viewable region corresponding to a viewable area of the liquid crystal display;

a first light source positioned proximate to the second major face and within the viewing region for producing light;

an injection feature proximate to at least one of the second major face and the first major face and within the viewing region to optically couple the light into the waveguide such that the light becomes waveguided light;

a plurality of extraction features proximate to at least one of the second major face and the first major face and within the viewing region to optically couple the waveguided light out of the waveguide, the plurality of extraction features having an extraction density that varies, the backlight system having an optical depth and further comprising a reflective layer proximate the second major face;
a transmissive diffuser proximate the first major face; and
a second light source having a similar color characteristic to the first light source, wherein the optical depth is less than a lateral separation between the first light source and the second light source.

20. The backlight system of claim 19, wherein the injection feature has an injection feature leakage that matches the extraction density.

21. The backlight system of claim 19, wherein the extraction features have a first extraction density in a first direction from the injection feature and a second extraction density in a second direction from the injection feature, the first direction being generally orthogonal to the second direction.

22. The backlight system of claim 19, wherein the waveguide has a first spread function in a first direction and a second spread function in a second direction, the first and second spread functions being different, the first direction being generally orthogonal to the second direction.

23. The backlight system of claim 19, wherein the extraction density of at least a portion of the extraction features varies with one or more of orientation and spatial position.

24. The backlight system of claim 19, wherein the injection feature is a first injection feature, and the backlight system further comprises a second injection feature which optically couples light from the second light source into the waveguide such that it becomes waveguided light, and wherein the second injection feature is one of the extraction features that optically couple the waveguided light from the first light source out of the waveguide.

25. The backlight system of claim 19, further comprising circuitry configured to individually drive the first and second light sources.

26. A backlight system for a liquid crystal display, the backlight system having an optical depth, the backlight system comprising:

a substantially planar waveguide including a first major face and a second major face opposite the first major face, the waveguide including a viewable region corresponding to a viewable area of the liquid crystal display;

a light source positioned proximate to the second major face and within the viewing region for producing light;

an injection feature proximate to at least one of the second major face and the first major face and within the viewing region to optically couple the light into the waveguide such that the light becomes waveguided light;

a plurality of extraction features proximate to at least one of the second major face and the first major face and within the viewing region to optically couple the waveguided light out of the waveguide, the plurality of extraction features having an extraction density that varies;

a reflective layer proximate to the second major face; and
a transmissive diffuser proximate to the first major face, wherein the optical depth is at least three times a distance between the first major face and the second major face.

* * * * *